May 6, 1952  F. H. REIJNDERS  2,595,409
APPARATUS FOR TAKING STEREOSCOPIC PICTURES
WITHOUT ABNORMAL STEREOSCOPIC EFFECTS
Filed Feb. 10, 1947
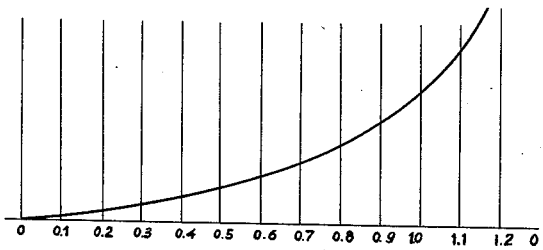
Fig. 1.
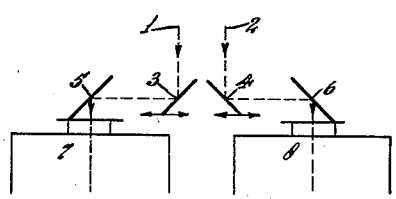
Fig. 2.
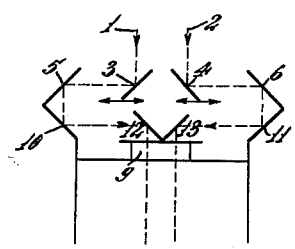
Fig. 3.
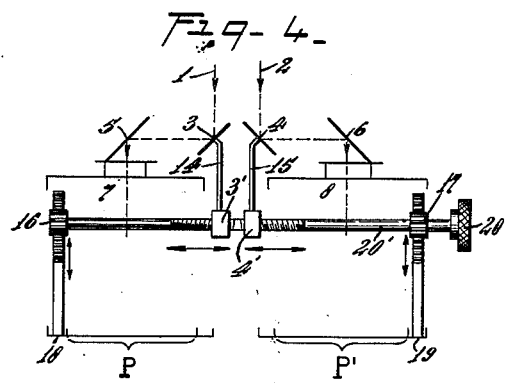
Fig. 4.
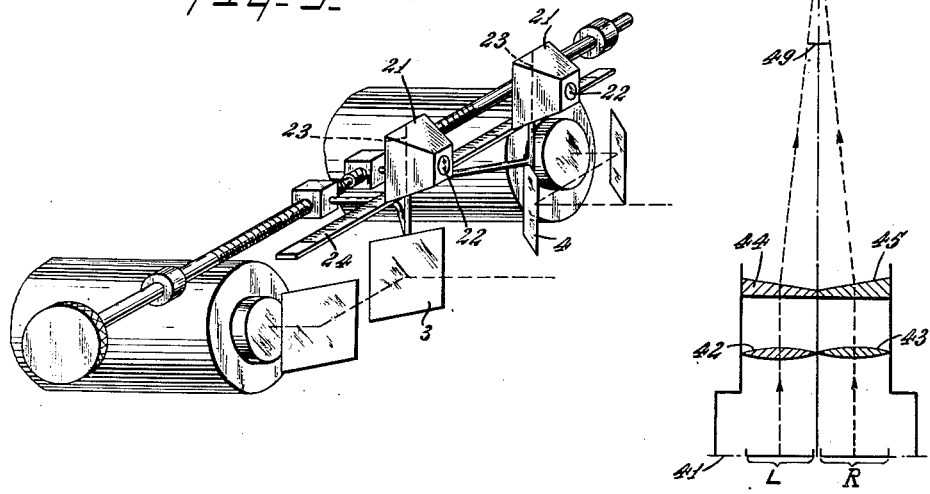
Fig. 5.
Fig. 6.
INVENTOR.
Franciscus Henricus Reijnders
BY
ATTORNEYS

Patented May 6, 1952

2,595,409

UNITED STATES PATENT OFFICE 2,595,409

APPARATUS FOR TAKING STEREOSCOPIC PICTURES WITHOUT ABNORMAL STEREOSCOPIC EFFECTS

Franciscus Henricus Reijnders, Schipluiden, Netherlands

Application February 10, 1947, Serial No. 727,476
In the Netherlands July 5, 1941

Section 1, Public Law 690, August 8, 1946
Patent expires July 5, 1961

1 Claim. (Cl. 88—16.6)

The invention relates to a method and apparatus for taking, projecting and observing stereoscopic pictures, whereby the occurrence of abnormal stereoscopic effects during the observation of the said pictures is avoided with the aid of polarized light or other selective optical means, such as the so-called grating systems, or the complementary colour systems. According to the invention said abnormal stereoscopic effect, known as hyperstereoscopic effect, is avoided by keeping the angle between the lines running from the object to the optical means of the stereoscopic camera constant or substantially constant. The most favorable value of said angle is 0.6°, whereas the tolerance limits are between 0.3° and 1.2°. The invention also relates to films and photographs (including those taken with the aid of special rays, such as Röntgen rays and infra-red rays), television pictures and the like, that have been taken or projected by means of the method according to the present invention.

The expression "abnormal stereoscopic effect" relates to deviations, distortions or disturbances with respect to the observation of the natural three-dimensional proportions. The latter may occur in a hyperstereoscopic sense whereby the depth proportion is enlarged or in hypostereoscopic sense whereby the said proportions are reduced; or in such a sense that a distortion of the entire stereoscopic picture is observed. Finally distortions may occur in the stereoscopic observation due to the fact that under special circumstances the stereoscopic impression may disappear repeatedly. It has appeared that when observing stereoscopic pictures by the methods and means for stereoscopic photographing and projecting, hitherto known, the above phenomena cannot be eliminated.

It was found that the problem is not only of a technical-physical nature, but that certain factors pertaining to the physiology of the human eye play an important part, while the problem is partially one of a psychological nature.

In the first place it was ascertained on what condition stereoscopic observation is generally dependent.

For all three-dimensional observations the essential condition is the following one: There must be formed two retinal images the disparity of which is such that the angle of disparity, that is to say the angular difference between the binocular parallax of a fixation point and that of a point near the fixation point, does not amount to less than 5 seconds.

The next condition is the correct co-operation of the optical axes of the eyes. If the eyes of the observer do not co-operate well, e. g. on account of faulty anatomic proportions of the eye muscles, strong refraction-anomalies, difference in the sharpness of vision of the two eyes etc. this may hamper stereoscopic vision by means of the binocular parallax (retinal disparity).

It was found that even a slight, outwardly invisible disturbance of the equilibrium of the eye muscles or "heterophory" (consisting in either "exophory" or "esophory") which latent disturbance has been found to be even more common than the perfect equilibrium of the eye muscles ("orthophory") may in certain cases hamper the said faculty of stereoscopic vision and may even completely eliminate the same.

It was found, moreover, that the results of such a disturbance are more serious in proportion to the rate of speed at which the said faculty is to be utilized, which fact is of special importance for the observation of moving pictures such as film or television pictures.

It was likewise found that a certain amount of time is required in each case for the correction of the said deviation and the subsequent adaptation of the axes of the eyes, so that if the changing of the elementary images is of such a nature that a rapid change of the angles of convergency is required, stereoscopic vision may become perfectly impossible.

a. From the above mentioned tests the first condition for a general partical use of stereoscopic images has been derived, i. e. that this characteristic of the human eye is to be taken into consideration and that the technics of taking, projecting and seeing the pictures must be of such a nature that the stereoscopic image will be perceptible not only to orthophorous, but also to the very high percentage of heterophorous spectators. This purpose may be attained best by means of a system according to which each eye will automatically receive the elementary image intended for the same, such as e. g. by means of the known polarization system.

It is an object of the instant invention to obtain observations of stereoscopic pictures in natural proportions.

Other objects of the instant invention will become apparent in the course of the following specification.

The invention will appear more clearly from the following detailed description when taken in connection with the accompanying drawings, showing, by way of example, preferred embodiments of the inventive idea.

In the drawings:

Figure 1 is a graphical representation of the progress of the three-dimensional observation of pictures in proportion to the angle of vision and in which the ordinate at 0.6° represents the value of the angle of vision at which perfect stereoscopy will occur.

Figure 2 is a diagrammatic illustration of a system of prisms or mirrors arranged to obtain any desired change in the distance between the optical axes while maintaining the required angle of vision of 0.6°.

Figure 3 is a diagrammatic illustration of a system of prisms or mirrors showing how two images are thrown on a single screen by two halves of the same objective permitting variation of the base length without altering the angle of vision of 0.6°.

Figure 4 is a diagrammatic illustration of a system of mirrors or prisms for obtaining the required position of the optical axes in combination with a focusing device.

Figure 5 is a view in perspective of a device for measuring the distance between the objective and object coupled to the apparatus.

Figure 6 is a diagrammatic view of a projecting device and prisms causing two elementary images to cover each other precisely when projected onto a screen.

It was furthermore found that in order to see projected or printed elementary images as a natural three dimensional body more factors than those mentioned sub $a$ are of importance.

$b$. An important physiological factor is the so-called "orthoscopic space," that is to say the space beyond which an object cannot be seen in its actual three-dimensional proportions.

This space is located at a distance between approximately 0.5 and one metre from the observing eye and it is limited to the said dimensions owing to the fact that the size and the three-dimensional proportions of distant object do not change to the same degree, since the angle of disparity decreases in direct ratio to the square of the distance, whereas the angle of vision changes in inverse ratio to the distance.

It follows from the above that if an object photographed in the orthoscopic space in the usual manner is observed from a distance greater than the orthoscopic space, the picture cannot be seen in its natural proportions.

$c$. A third factor is the importance of the convergency of the eyes with regard to absolute three dimensional vision, that is to say the localization by means of the convergency of the eyes of an object with regard to the observer. Ocular convergency will provide comparatively accurate three dimensional data for points between one metre and 2.5 metres; at greater distances the said data will grow increasingly inaccurate. Because of this a stereoscopic picture of an object taken in the usual manner at a distance less than 2.5 metres and observed at a greater distance cannot be seen in its natural three dimensional proportions, while moreover, there will occur dimensional proportions on account of the factor to be discussed as follows:

$d$. A factor that influences the zone mentioned sub $b$ and $c$ as well as the space beyond the same, is the value of the difference between the angle of exposure and that of the observation of the stereoscopic picture.

If the angle of vision (that is to say the angle between the two optical axes) is greater by a certain value than the angle of observation, there will occur during stereoscopic observation (with equal bases of vision and observation and equal sizes of object and projection image) a magnification of the depth of the stereoscopic picture known as hyperstereoscopy. If the angle of vision is smaller than the angle of observation there will occur a reduction of the depth known as hypostereoscopy.

Theoretically speaking in case of the angle of vision being $a$ time as large as the angle of observation, there should occur an $a$-fold magnification of the depth. It was ascertained, however, that the said theoretical-geometrical stereoscopic picture is not in accordance with the actual picture observed by the spectator and that only in case of considerable differences between the values of the angles there will occur considerable changes in depth, while no perceptible magnifications occurred below a given difference in the values.

$e$. Finally the stereoscopic observation is influenced by the difference in the bases of vision and observation. If, however, the angles of vision and observation are alike, no abnormal stereoscopic effects will occur, while it was found, moreover, that changes in the dimensions which according to theoretical calculations ought to occur uniformly in all dimensions, were hardly perceptible in the projected picture.

In virtue of the above mentioned conditions and discoveries the following rules for the stereoscopic taking of pictures and the observation of the same in their natural proportions have been ascertained:

1. For the orthoscopic and the absolute stereoscopic zones it will be possible, in case of a greater distance of observation than the distance of vision, to obtain observation in natural proportions by giving a predetermined value to the angle of vision to be described sub 4, the basis of vision changing in that case in proportion to the distance to the object. The value of the said angle of vision must be smaller than the angle of convergency of the optical axes of the eyes with regard to a point situated at a distance equal to the zone in question.

By the term "angle of vision" there is to be understood in the present case, as already mentioned, the angle defined by the optical axes of the photographic apparatus that are converging towards the point of the object nearest to the operator in such a way that they will intersect each other at a point in the nearest plane of the object to be photographed.

2. The optical axes running from the objective to the object are to converge, since with objectives directed parallel to each other, particularly with short distance exposures there may occur a deformation of the stereoscopic picture, owing to the formation of disparity images that are different from the physiological disparity images of the retinae in case of the optical axes of the eyes converging towards the object.

The convergency of the optical axes, is moreover, necessary with a view to the important technical possibility of bringing the two elementary images in case of projection on a screen or a sensitive plate or the like to a perfect superposition.

This will facilitate stereoscopic vision to the great multitude of spectators troubled with orthophoric deviations. The practically perfect merging of the two elementary images into a single image on the screen, which may be obtained by means of the projection apparatus to be described hereinafter, renders it possible for those who are incapable of, or averse to, stereoscopic vision to see the stereoscopic projection as an ordinary two-dimensional film or television picture.

Minimal deformations (if any) of the edges may be prevented by a correcting window provided in the camera or the projecting apparatus.

3. The optical axes running from the objective to the image receiving surface (film, sensitive plate or television exposure surface) are to be perpendicular to the said surface. This may be obtained by causing the prisms or mirrors 5 and 6 in Figures 2 and 4 or 12 and 13 in Figure 3 to define a correcting angle.

4. With regard to the value of the angle of vision which is to be used for the above mentioned zone, as well as for the remaining exposure zone, in order to make it possible to observe the stereoscopic picture, at any desired distance from the screen and from all directions usual for the observation thereof, it was found that a complete neutralization of abnormal stereoscopic effects will be obtained by adjusting the distance of the optical axes of a picture taking apparatus in such a way, depending on the distance to the object, that the said axes will intersect each other in a point of the nearest plane of the object to be photographed, while the value of 0.6° for the angle defined by the said optical axes is to be maintained.

If the value of the above mentioned angle exceeds 0.6° hyperstereoscopy will occur under certain conditions. Up to about 1.2° hyperstereoscopy will, however, still be limited to such a degree that no abnormal stereoscopic effect will be obtained as yet.

If the value of the above mentioned angle is below 0.6° hypostereoscopy will begin to occur under certain conditions. Down to approximately three tenth of a degree hypostereoscopy is still limited so much that no abnormal stereoscopic effect will be obtained as yet.

It will be evident therefore that according to the invention it is necessary in order to obtain the correct stereoscopic effort that the angle in question is to remain substantially constant, the term "substantially" indicating that variations within the limits mentioned above are also permissible and that consequently during exposure the angle may slowly vary between the said limits.

Figure 1 symptomatically represents the progress of the three-dimensional observation of pictures according to the invention, in proportion to the angle of vision.

In this figure the ordinate at 0.6° represents the value at which perfect stereoscopy will occur. At values of the angle above 0.6° some traces of hyperstereoscopy will gradually appear under certain conditions (a. o. depending on the nature of the object), without the stereoscopic effect being abnormal. At values of the angle below 0.6° some traces of hypostereoscopy will gradually occur under certain conditions without the stereoscopic effect being abnormal.

It is known in itself when taking stereoscopic pictures to focus the axes of the objective on the same point of the object to be photographed (vide e. g. Dutch Patent No. 50,797, French Patent No. 566,319 and British Patent No. 178,344).

It is, however, impossible to obtain by means of the photographic apparatus according to the said patent specifications the extremely low value according to the present invention for the angle between the optical axes for exposures in the zone of the shortest distance, in which the abnormal stereoscopic effect is particularly prevalent.

(When making e. g. exposures at a distance of one metre from the object, it would be necessary, in order to obtain the said values for the angle defined by the optical axes, that the centres of the lenses of the objective be located about 10 millimetres apart from each other, whereas with the arrangement according to Dutch Patent No. 50,797 such a small distance between the prisms is absolutely impossible.)

According to the invention there is provided in that case in the photographic apparatus in front of the objectives a system of prisms or mirrors, in such a way that it is possible to obtain any desired change in the distance between the optical axes (either or not in combination with a focussing of the image according to distance), while at the same time the required angle of 0.6° (or at least between 0.3° and 1.2°) that is to be defined by the optical axes, is maintained.

The above construction is further elucidated in Figure 2 of the drawing representing one of the possible embodiments. In the said Figure 2 the reference numerals 1 and 2 denote the area converging towards the same point in the plane of the object, the said axes defining an angle of 0.6°. The rays of light are reflected by the mirrors 3 and 4 and subsequently by the mirrors 5 and 6 into the objectives 7 and 8 of the two cameras. The distance of the mirrors 3 and 4 may be taken larger, if the object is farther away, in order to maintain the angle of 0.6°.

The position of the mirrors 5 and 6 is to be such that the rays from the picture taken, are reflected perpendicularly onto the sentitive plate, film or television surface. This also holds good for Figures 3 and 4.

In Figure 3 it is shown how the two images are thrown on a single screen by the two halves of one and the same objective 9, the mirrors represented in Figure 2 being completed by the mirrors 10 and 11, and likewise 12 and 13, while by shifting the mirrors 3 and 4 it will be possible to vary the base length without altering the angle of 0.6°.

The mirrors may also be replaced by totally reflecting prisms. The angle of 0.6° between the axes may be obtained either by the manner in which the mirrors or prisms are mounted, or by deviating from the normal angles of reversing prisms.

Figure 4 represents an embodiment of the mirror or prism system for obtaining the required position of the optical axes, in combination with a focussing device. In this figure 1 and 2 are the axes converging to one and the same point of the object-plane and defining an angle of 0.6°. This angle remaining constant, the mutual distance of the mirrors (or prisms) 3 and 4 is defined by the distance of the object. The distance between the objectives (7 and 8) and the sensitive plate or film or television exposure surface (P and P') required for the focussing-operation also depends in a known manner on the distance of the object. Consequently both values (the mutual distance of the mirrors and the distance between the objective and the image receiving surface) as functions of the distance of the object are to be calculated in their mutual proportion and to be adjusted by a single controlling mechanism. To this end a rotatable spindle (20') is used, which is provided with two screwthreads having the same pitch, though of opposite direction, by means of which the mirrors (3 and 4) arranged thereon, are adapted to be moved to an equal extent towards and away from each other.

The mirrors 3 and 4 are connected to the spindle by means of holders (3' and 4') cooperating with the said spindle, while the rods (14 and 15) are bent in such a manner that said mirrors are directed parallel to the mirrors (5 and 6) and opposite to the same. Furthermore two toothed-wheels (16 and 17) of equal dimensions are arranged on the above-mentioned spindle (20'), said toothed-wheels engaging two toothed racks attached to the portion of the apparatus (18 and 19) containing the sensitive plate or film or television image receiving surface (P and P'), so that by turning the spindle the distance between this plate or film or television image receiving surface and the objective may be increased or decreased. According to the above explanation the relation between this movement and that of the mirrors, in connection with the distance of the object, can be calculated and can be applied to the mechanism. Consequently it is possible to control by a single movement of the spindle (20) the mutual distance of the mirrors, depending on the distance of the object, while at the same time the corresponding distance between the sensitive plate or the film or the television image receiving surface and the objective may be obtained.

As it may be useful for the process according to the invention that the distance between the objective and the object is accurately indicated, another embodiment of the apparatus is illustrated in Figure 5 according to which a device for measuring the said distance is coupled to the apparatus, whereby it is obtained, that together with the proper adjustment for the stereoscopic exposure the correct distance to the object is indicated.

For this purpose a ground glass 21 with a lens 22 is provided on each of the movable mirrors or prisms 3 and 4, in such a way that an image of the object to be photographed is formed on the ground glass.

Since the distance between the movable prisms 3 and 4 changes in direct ratio to the distance to the object, the correct measuring of the distance may be brought about in the following manner:

In the middle of each of the ground glasses 21 there is provided a mark line 23 in which lines when a certain point of the object is focussed the said point has to be observed. In that case the correct focussing for a stereoscopic exposure has been obtained.

The required distance from the camera to the object to be photographed may moreover be read directly from a scale 24 having the same width as the basis of the exposure, which scale has been marked in accordance with different distances and along which the two ground glasses 21 may be shifted. In accordance with the distance thus ascertained focussing may be effected with regard to a film, a sensitive plate or a television exposure surface.

The method and apparatus for taking stereoscopic pictures according to the invention may also be used in essentials in combination with the usual accessories for making exposures, such as a yellow filter, a telelens and the like, which combinations are considered to reside within the scope of the present invention. It was found that in order to observe objects that have been photographed by means of a magnifying lens or systems of lenses, the basis is to be enlarged in direct ratio to the enlarging factor.

If the apparatus according to the invention is arranged in such a way that the film or the light sensitive plate is replaced by the image receiving surface of a television camera, stereoscopic television may be obtained without any abnormal stereoscopic effect. The projection of the stereoscopic television images may be effected by means of one of the known selective means, such as the polarization system or the grating system.

The taking of stereoscopic elementary images on films may be accomplished according to the invention: either by photographing the two elementary images side by side on a film or simultaneously photographing an elementary image on each of two synchronously running films.

It is also possible to photograph and to project alternately a left hand side elementary image and a right hand side elementary image on the full width of the film. The projection of the films containing the elementary images must be effected in such a way that the two elementary images will cover each other on the screen: either by focussing the two objectives, if the projection is made from two films each containing a single elementary image and running synchronously, or else with the aid of prisms or mirrors, if projection is effected by a single fixed objective, or by two fixed parallel objectives from a film containing the two elementary images located side by side.

When applying the polarization system it will be necessary, to use a non-polarizing screen consisting e. g. of ground glass in case of transmitted light or of ground glass covered on one side with a reflecting layer, such as e. g. finely divided pulverized aluminum in case of incident light.

Finally it is shown in Figure 6, by way of example in what manner it has been made possible to control whether a film, a photograph or a television image has been taken in accordance with the angle according to the invention.

In the said figures, the reference numeral 41 denotes a film containing the two elementary images L and R placed side by side; 42 and 43 are the objectives of a projecting device, 44 and 45 are prisms that will cause the two elementary images to cover each other precisely when projected onto a screen 46. If the distance between the projecting device and the screen is chosen in such a way that the projected image 48 will be congruent with the object that has been photographed the angle 49 defined by the two optical axes will equal the angle according to which the image was taken.

I claim:

In an apparatus for taking stereoscopic pictures of an object, the apparatus having two image receiving surfaces in the same plane; an objective for each image-receiving surface, adjustable, separate, light-transmitting means between the objectives and the object, the optical axes from said light-transmitting means to the object having an angle of convergence of substantially 0.6°, means moving the light-transmitting means towards and away from a plane through the object and through a point intermediate between the light-transmitting means along a line perpendicular to said plane and maintaining said angle of convergence constant when the light-transmitting means are directed from the first object to another object at a different distance therefrom and directing the light beams through the objectives to the image-receiving surfaces.

FRANCISCUS HENRICUS REIJNDERS.

REFERENCES CITED

The following references are of record in the file of this patent:

UNITED STATES PATENTS

| Number | Name | Date |
|---|---|---|
| 1,186,786 | Huber et al. | June 13, 1916 |
| 1,328,291 | Parker | Jan. 20, 1920 |
| 1,585,129 | Smith | May 18, 1926 |
| 1,973,822 | Mendez | Sept. 18, 1934 |
| 2,168,273 | Sauer et al. | Aug. 1, 1939 |
| 2,240,398 | Huitt | Apr. 29, 1941 |
| 2,267,952 | Sauer | Dec. 30, 1941 |
| 2,268,338 | Kober et al. | Dec. 30, 1941 |
| 2,295,243 | Steinman | Sept. 8, 1942 |
| 2,303,742 | Howells | Dec. 1, 1942 |
| 2,326,951 | Kober et al. | Aug. 17, 1943 |
| 2,413,996 | Ramsdell | Jan. 7, 1947 |

FOREIGN PATENTS

| Number | Country | Date |
|---|---|---|
| 550,383 | France | Dec. 11, 1922 |
| 558,873 | France | June 4, 1923 |
| 56,669 | Netherlands | July 15, 1944 |